R. R. JONES.
CAR DOOR.
APPLICATION FILED APR. 15, 1909.
934,540.
Patented Sept. 21, 1909.
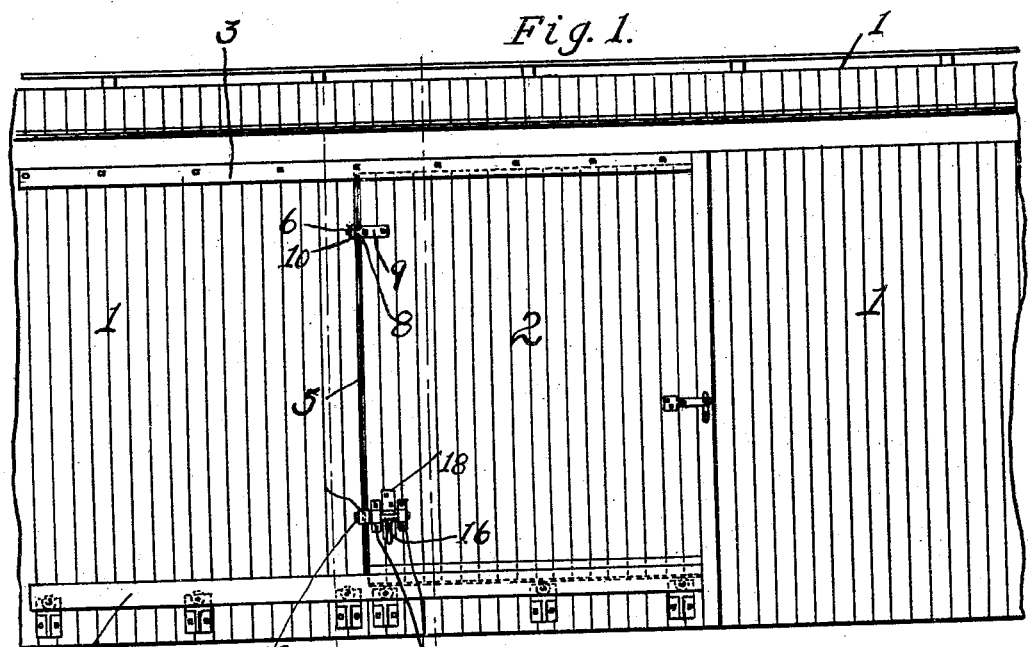
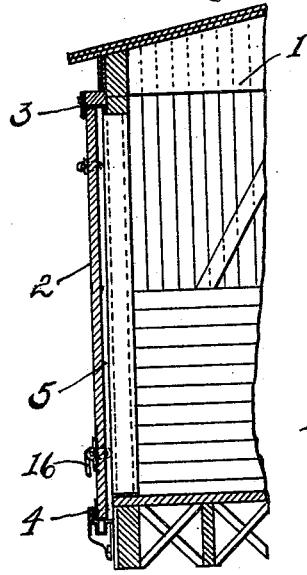
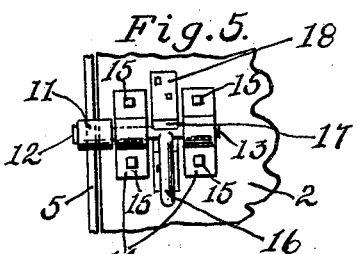
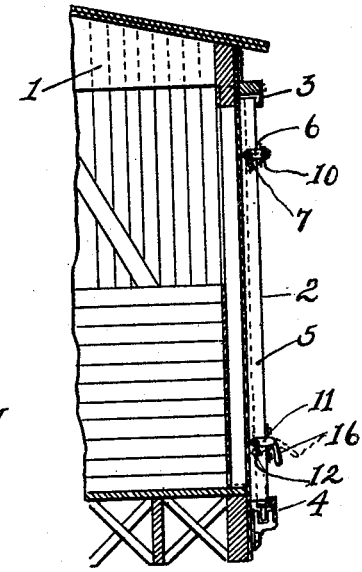
Witnesses;
E. E. Wessels.
W. C. Smith
Inventor;
Robert R. Jones.
By Joshua R. H. Potts
his Attorney.

UNITED STATES PATENT OFFICE.

ROBERT R. JONES, OF CHICAGO, ILLINOIS.

CAR-DOOR.

934,540.

Specification of Letters Patent. Patented Sept. 21, 1909.

Application filed April 15, 1909. Serial No. 490,063.

*To all whom it may concern:*

Be it known that I, ROBERT R. JONES, a citizen of the United States, and a resident of the city of Chicago, county of Cook, and State of Illinois, have invented certain new and useful Improvements in Car-Doors, of which the following is a specification.

My invention relates to improvements in car doors, and more particularly to freight car sliding doors, the object of the invention being to provide means in the door for impinging the side of the car, and thus preventing the jarring and rattling incident to doors which are loosely mounted in their guides.

A further object of my invention is to provide a metallic plate connected to the rear edge of the car door, an edge of which is shaped to conform to the side of the car, so that when the same is pressed thereagainst, a tight joint is formed.

Other objects will appear hereinafter.

With these objects in view my invention consists in the novel construction and arrangement of parts as will be hereinafter fully described and particularly pointed out in the appended claims.

My invention will be more readily understood by reference to the accompanying drawings forming a part of this specification, and in which, Figure 1 is a side elevation of a portion of a car embodying my invention in its preferred form, Fig. 2 is a transverse section thereof, Fig. 3 is a transverse section of the body of the car and a rear elevation of the car door, Fig. 4 is a detail rear elevation, Fig. 5 is a detail side elevation, and Fig. 6 is a detail perspective view.

Referring now to the drawings 1 designates the body of the car and 2 an ordinary sliding door mounted in the top and bottom guides 3 and 4 respectively. Ordinarily an opening exists between the door and the body of the car, and to provide means for closing this opening is the main object of my invention, as aforesaid. To accomplish this object a substantially rectangular plate 5 is provided whose length is substantially equal to the height of the door, and whose width is equal approximately to the thickness of the door. A link 6 is pivoted to the side of the plate 5 adjacent the upper extremity thereof by means of the rivets 7 and to the reduced portion 8 of the plate 9 which is secured to the side of the door, a cotter-pin 10 being provided to hold said link in position on said reduced portion. A link 11 is pivoted to the side of the plate 5 adjacent the lower extremity thereof by means of the rivet 12, said link being integral with a horizontal longitudinally extending rod 13 journaled in the bearings 14 which are secured to the side of the door by means of bolts 15. The links 6 and 11 are arranged parallel to each other so that when one is moved the other must move also, causing each end of the plate 5 to approach or recede from the side of the car simultaneously.

Integral with and extending at right angles to the rod 13 is a handle 16, whereby the same may be rotated by an operator, and also integral with said rod is an eccentric 17, the axis of which is farther removed from the door than the axis of said rod, so that when the handle 16 is depressed said eccentric engages the plate 18 inserted in the side of the door, thus forming a frictional locking means holding the handle in the depressed position and the plate 5 in the elevated position. The rivets 7 and 12 forming the inner pivots of the links 6 and 11 respectively are at all times below the plane of the outer pivots during the upward and inward movement of the plate 5, and said plate is so adjusted as to impinge the side of the car simultaneously with the engagement of the eccentric 17 with the plate 18.

An upward movement of the handle 16 releases the eccentric and throws the plate 5 into the dotted line position, when the door is free to move in its guides.

Various slight changes might be made in the general form and arrangement of parts described without departing from my invention, and hence I do not restrict myself to the precise details set forth, but consider myself at liberty to make such changes and alterations as fairly fall within the spirit and scope of the claims.

Having described my invention what I claim as new and desire to secure by Letters Patent is:

In a device of the class described, a car door having a substantially rectangular plate adapted to engage the side of the car in connection therewith at the rear edge thereof, said connection consisting of links pivoted to said plate and to said door, the pivotal connection with the door of one of said links comprising a rod journaled in bearings secured to the door, and an eccentric integral with said rod adapted to be locked by frictional engagement with a plate inserted in the side of the car when a handle disposed at right angles to said rod is depressed, substantially as described.

In testimony whereof I have signed my name to this specification in the presence of two subscribing witnesses.

ROBERT R. JONES.

Witnesses:
  JOSHUA R. H. POTTS,
  W. C. SMITH.